United States Patent [19]

Zito

[11] Patent Number: 4,921,327

[45] Date of Patent: May 1, 1990

[54] METHOD OF TRANSMITTING AN IONIZING RADIATION

[76] Inventor: Richard R. Zito, 330 N. Mathilda Ave. (#606), Sunnyvale, Calif. 94086

[21] Appl. No.: 356,115

[22] Filed: May 24, 1989

[51] Int. Cl.⁵ .................... G02B 6/20; G01N 23/00; G21K 1/06

[52] U.S. Cl. .................... 350/96.32; 250/251; 250/395; 250/473.1; 350/320; 378/51; 378/145; 378/204

[58] Field of Search ............ 350/96.10, 96.28, 96.32, 350/320; 378/1, 51, 59, 62–64, 145, 147, 161, 204, 205, 206, 210; 250/251, 395, 396 R, 400, 473.1, 505.1

[56] References Cited

U.S. PATENT DOCUMENTS 4,602,425 7/1986 Kronenberg .................. 350/96.32 X
4,652,083 3/1987 Laakmann .................... 350/96.32

FOREIGN PATENT DOCUMENTS 0216421 4/1987 European Pat. Off. ......... 350/96.32
61-48805 3/1986 Japan ................................ 350/96.32
61-80206 4/1986 Japan ................................ 350/96.32

OTHER PUBLICATIONS

Watanabe et al., "Soft X-Ray Transmission Characteristics of Hollow-Core Fused-Quartz Fibers", *Applied Optics*, vol. 24, No. 23, Dec. 1, 1985, pp. 4206–4209.

*Primary Examiner*—John D. Lee

[57] ABSTRACT

A thin, flexible, hollow fiber capable of transmitting ionizing radiation. Ionizing radiation enters the fiber through entrance pupil (10) and travels through the hollow interior of fiber body (20) by reflecting and scattering off the inner wall of the fiber, frequently at grazing incidence angles. Fiber body (20) is covered at one end by thin film cap (30) which is thin enough to be at least semitransparent to ionizing radiation, but which is also strong enough to allow air to be withdrawn from fiber body (20) at the opposite uncapped end. Small obstructions (32) at the exit end of the fiber can be used to spread the beam of ionizing radiation to a desirable width. A flexible fiber capable of transmitting ionizing radiation has important applications in medicine for the radiation therapy of tumors. Applications also exist in communications and other fields.

3 Claims, 2 Drawing Sheets

METHOD OF TRANSMITTING AN IONIZING RADIATION

BACKGROUND-FIELD OF INVENTION

This invention relates to fiber optics, specifically to such fiber optics which are capable of transmitting X-rays, γ-rays, energetic particles, and ionizing radiation in general.

BACKGROUND-DESCRIPTION OF PRIOR ART

Ionizing radiation includes any type of electromagnetic photon or energetic particle capable of producing ions upon passage through matter. Ionizing photons include X-ray and γ-ray photons. Ionizing particles include energetic electrons as well as protons, helium ions, and other heavy ions. Practical applications of ionizing radiation are frequently limited by the difficulty associated with directing such radiation around curves and through matter. Techniques for directing uncharged photons of ionizing radiation around curves have proven elusive since X-rays and γ-rays tend to penetrate matter and follow straight lines until absorbed. However, some progress has been made in focusing X-ray beams in X-ray telescopes (T. Zebnpfennig, R. Giacconi, R. Haggerty, "A Laboratory Program to Develop Improved Grazing Incidence X-Ray Optics", NASA, Wash. D.C., February 1967). Techniques for bending and focusing beams of energetic charged particles involve the use of magnetic fields. However, generation of suitable magnetic fields require large clumsy magnets which are not amenable to microminiaturization (D. H. Perkins, "Introduction to High Energy Physics", Addison-Wesley, 1972, pp. 44-72.). Another aspect of ionizing radiation which limits applications is the short distance that such radiation can travel in matter (including air) before it is absorbed. This absorption is due to the fact that creation of ions robs the radiation of its energy thereby limiting its range. Because of the difficulties associated with bending beams of radiation, current applications of ionizing radiation in medicine have some undesirable side effects. Furthermore, the short range of ionizing radiation in matter has caused some important potential applications of such radiation in communications to be ignored. Subsequent paragraphs summarize a few aspects of state-of-the-art methods and limitations associated with the use of ionizing radiation in medicine and communications.

In medicine both energic photons as well as particles have found wide spread application in the radiation therapy of cancer since malignant cells are more susceptible to the destructive effects of radiation than normal cells. Many types of cancers respond well to radiation therapy, these include esophageal cancers, and lung cancers. However, traditional methods of radiation therapy may damage normal transit tissue between the tumor and the radiation source (C. M. Mansfield, B. F. Kimler, S. D. Henderson, D. J. Svoboda and T. S. Vats, "Development of Normal Tissue Damage in the Rat Subsequent to Thoracic Irradiation aand Prior Treatment with Cancer Chemotherapeutic agents," Am. J. Clin. Oncol. 7(5), p. 425-430; also see H. Tsunemoto, "Objective for Clinical Use of Particle Radiations with high LET," Gan. No. Rinsho. 31(12), pp 1563-1565, September 1985). A recent technique employing non-ionizing radiation for treating tumors involves piping optical laser radiation via an optical fiber into the body to a location where a localized tumor exists. The tumor is then destroyed by laser heating (H. F. Schellhas and B. Weppelmann, "The Neodymium: YAG laser in the Treatment of Gynecologic Malignancies," Lasers Surg. Med. 3(3), 225-229 (1983); S. M. Shapshay, R. K. Davis, C. W. Vaughan, M. Norton, M. S. Strong, and G. T. Simpson, "Palliation of Airway Obstruction from Tracheobronchial Malignancy: Use of the $CO_2$ Laser Bronchoscope," Otolaryngol. Head Neck Surg. 91(6), pp. 615-619 (December 1983); M. Feldman, A. Ucmaki, S. Strong, C. Vaughan, S. Kim, and A. Bylinski, "Applications of Carbon Dioxide Laser Surgery and Radiation. A Preliminary Report," Arch. Otolaryngol. 109(4), pp. 240-242, (April 1983)). This technique has the advantage of being able to reach internal tissues of the body without surgery due to the flexibility of the optical fiber and its ability to follow the contours of the body's natural passageways such as the trachea and esophagus. However, such a technique has been primarily limited to treatment of localized tumors on surfaces of such passageways due to the opacity of living tissue to infrared and visible radiation (A. Katzir, "Optical Fibers in Medicine," Scientific American, May 1989, pp. 120-125).

Recent work has shown that there are certain advantages to using discrete photons for crytographically secure communications (P. Wallich, "Quantum Cryptography," Scientific American, May 1989, pp. 28-30). Although Hartly's law (G. M. Miller, "Handbook of Electronic Communications," Prentice-Hall, Englewood Cliffs, 1979, pp. 19-20) implies that X-rays and γ-rays have the potential to carry information at more than 1000 times the rate at which information can be transmitted on optical fibers, no use has been made of these ionizing radiations for information transmission purposes. The reason for this is easy to understand since, as previously discussed, X-rays and γ-rays tend to follow straight lines until absorbed. This fact has discouraged the development of a "wave guide" for X-rays. Furthermore, absorption of ionizing radiation tends to make signal propagation difficult. For example, half the thulium-170 X-ray radiation with a wavelength of $2.38 \times 10^{-11}$ meters is absorbed by a 0.001 meter thickness of lead (J. C. Robertson, "A Guide to radiation Protection," John Wiley, New York, 1976, p. 30). In air, half the intensity of a beam of thulium-170 X-rays are absorbed in a few tens of meters.

OBJECTS AND ADVANTAGES

Accordingly, several objects and advantages of my invention are:

(a) to provide a thin flexible fiber capable of following the contours of the body's natural passageways and transmitting ionizing radiation whose frequency, or particle type and energy, may be selected so as to maximize damage to a tumor while minimizing damage to nearby normal tissue during radiation therapy;

(b) to provide a thin flexible fiber capable of following the contours of the body's natural passageways and transmitting X-rays or other types of ionizing radiation, instead of light in the infrared to ultraviolet frequency range, so that treatment of subsurface tumors would be possible;

(c) to provide a thin flexible fiber capable of passing through tissues in inoperable parts of the body, with minimal disturbance, and transmitting ionizing radiation so that one or more tumors in these inoperable locations may undergo radiation therapy;

(d) to provide a thin flexible fiber capable of delivering a beam of energetic particles, or particles and X-rays, at such an intensity that malignant tissue can be subject to both beam heating and radiation therapy simultaneously, so that radiation can destroy any scattered malignant cells which escape thermal destruction;

(e) to provide a thin flexible fiber capable of transmitting ionizing radiation with little loss by leakage through the walls of the fiber;

(f) to provide a thin flexible fiber capable of transmitting modulated beams of X-rays or γ-rays over distances of kilometers for the purpose of communications.

Further objects and advantages of my invention will become apparent from a consideration of the ensuing description of drawings.

DRAWING FIGURES

Figure 1:
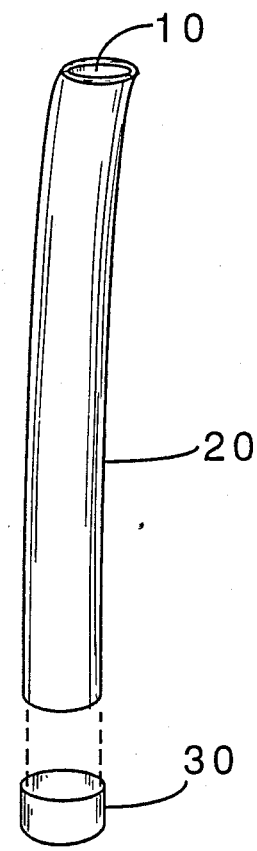
FIG. 1 shows a perspective view of a fiber capable of transmitting ionizing radiation (including both photon and particle radiation).

REFERENCE NUMERALS IN DRAWINGS 10 entrance pupil
20 flexible tubular fiber body
30 cap
32 partial obstructions

DESCRIPTION-FIGS. 1 TO 2

A typical embodiment of a fiber capable of transmitting both photon and particle types of ionizing radiation is shown in FIG. 1. Ionizing radiation enters the hollow evacuated interior of the device in FIG. 1 through an entrance pupil 10.

Next, ionizing radiation travels through a flexible tubular fiber body 20 which is usually, but not necessarily, made of crystalline metal. For medical applications the metal will usually be stainless steel or gold, since these metals can be properly sterilized for medical procedures. Typically, fiber body 20 will have an inside diameter of about 0.03 cm and an outside diameter of about 0.07 cm. That means the wall thickness of fiber body 20 is about 0.02 cm. This latter wall thickness is probably an upper limit for many medical applications because flexibility is required so that a long fiber (approximately 1 meter long) can be passed through and along the curves of the body's natural passageways. Also, it may be highly desirable to reduce the outside diameter of the fiber for certain microsurgical medical applications. For communications applications a non corroding stainless steel fiber is ideal for direct burial in soil or for submersion in water. Transmission of information carrying signals requires a fiber whose length may be many kilometers although the inside and outside diameter of the fiber may be the same as those cited above for medical applications. Hollow fibers are made by starting with a tube of material, heating the tube, and then stretching the tube, or pushing it through a die, until the desired fiber diameter is reached. The technique is well known and can be used with malleable metals, glasses, and other materials (J. H. Moore, C. C. Davis, M. A. Caplan, "Building Scientific Apparatus," Addison-Wesley, London, 1983, pp. 60-61).

At the exit end of fiber body 20, from which radiation escapes, is an airtight cap 30 made of a thin film whose thickness may vary from about $4 \times 10^{-8}$ meters to about $4 \times 10^{-6}$ meters, and which is at least semitransparent to ionizing radiation. The film is usually made of carbon or gold, but is not necessarily limited to these materials. Carbon films are usually made by electric arc vaporization of carbon electrodes, while gold films are created by thermal evaporation of gold from a resistively heated tungsten boat or filament (L. I. Maissel, R. Glang, "Handbook of Thin Film Technology," McGraw Hill, New York, 1970, pp. 1/26-2/142). The material which is vaporized or evaporated (called the evaporant) can then be made to condense as a flat thin film layer on a soaped piece of relatively cold glass called the substrate. When this thin film-soaped substrate combination is slowly immersed into water by pushing it through the water-air interface at an angle of about 45°, the soap will dissolve and the film will separate from the substrate. Salt, which is also water soluble, may also be used instead of soap for the purpose of separation of the film from the substrate (L. I. Maissel, R. Glang, "Handbook of thin Film Technology," McGraw Hill, New York, 1970, p. 9/15). As the film separates from the substrate it will float onto the water surface being supported by surface tension at the water-air interface. The film may then be lifted off the surface of the water with a wire ring about 0.7 cm in diameter and laid down over one open end of fiber body 20. The film will automatically collapse around the fiber body due to its own surface tension to form an airtight seal, provided the film is thin enough. If an air tight seal cannot be realized for some films then the end of fiber body 20 can be coated with a thin layer of a low vapor pressure epoxy. Now, when the film is laid over the end of the fiber, the epoxy will seal the film to fiber body 20 in an airtight manner. Once the epoxy dries, and the thin film cap is in place, air may be removed from the opposite end (entrance pupil 10) of the fiber. Experiments have shown that thin film caps, with a thickness in the range described above, can withstand atmospheric pressure at the tip of fiber body 20. The importance of being able to remove air from the interior of the fiber will be discussed in detail in the next section. However, it should be noted that if it is intended to transmit X-rays only a short distance (a few meters or less) through flexible fiber body 20, and if there is no danger of the fiber backfilling with radiation absorbing liquids through capilary action, then film cap 30 is unnecessary.

Figure 2:
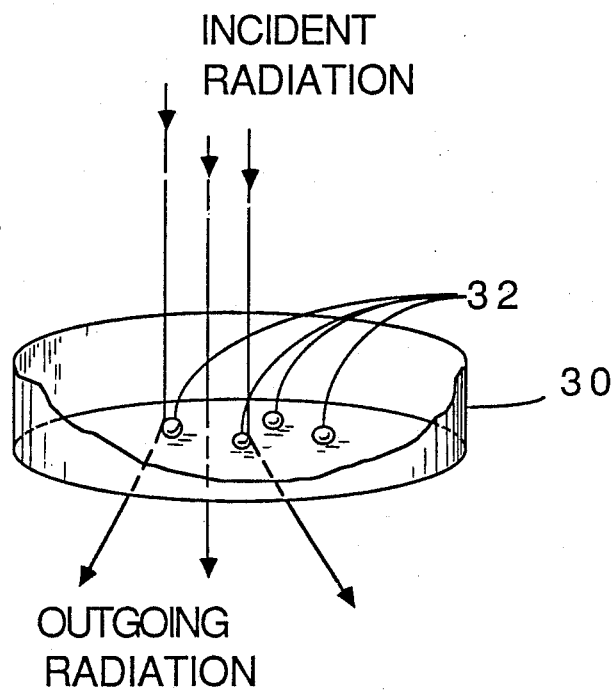
FIG. 2 shows a cut-away view of part 30 in FIG. 1.

FIG. 2 shows a cut away view of the interior of cap 30. The inside of cap 30 has been contaminated with small partial obstructions 32 whose purpose is to spread the exiting beam of ionizing radiation by a mechanism to be described in the next section. Typically, partial obstructions 32 are spheres of nickel, gold, beryllium, or aluminum, but other types of partial obstructions are possible. Partial obstructions about one micron or less in diameter will automatically adhere to the film cap by van der Waals' force. Larger partial obstructions can be attached to cap 30 by epoxy or some other adhesive. The number, size, composition, and shape of these partial obstructions can vary. For example, the partial obstructions can be needle or pyramid like instead of spherical and there size may vary from submicron dimensions up to almost the inside diameter or fiber body 20. Naturally, when the size of each partial obstruction is close to that of the inside diameter of fiber body 20 then only one partial obstruction may be possible, whereas as many thousands of partial obstructions may be used when each has submicron sized dimensions.

OPERATION-FIGS. 1 TO 2

In FIG. 1 ionizing radiation enters through entrance pupil 10. This ionizing radiation may be either of the photon type (X-rays or γ-rays), or the particle type (electrons, protons, helium ions, or heavy charged ions).

If photons enter through entrance pupil 10 then propagation along fiber body 20 is accomplished by successive grazing incidence reflections, Bragg reflections, and scatterings off the inner wall of fiber body 20. Grazing incidence reflection obeys Fresnel's equations and is most efficient for wavelengths above $10^{-10}$ meters. This reflection technique has been used most effectively to focus X-rays in space based X-ray telescopes (T. Zebnpfennig, R. Giacconi, R. Haggerty, W. Reidy, and G. Vaiana, "A Laboratory Program to Develop Improved Grazing Incidence X-Ray Optics," NASA, Washington, D.C., February 1967). For photons with a wavelength below $10^{-10}$ meters propagation by successive Bragg reflections occurs. In this mode of operation X-rays reflect from atomic planes of crystallites which make up the inner wall of a polycrystalline metal fiber body 20. This type of reflection forms the basis of the X-ray diffraction technique used to analyze crystal structures and is well known (E. F. Nuffield, "X-Ray Diffraction Methods," John Wiley, New York, 1966, pp. 55-58). Finally, γ-rays may be propagated by successive grazing incidence Bragg reflections and Compton scattering. In the latter mechanism γ-rays are scattered from the electrons of atoms that make up the inner wall of fiber body 20 (D. H. Perkins, "Introduction to High Energy Physics," Addison-Wesley, Reading, Mass., 1972, pp. 35-36). Compton scattering is operative regardless of whether the film is polycrystalline or not, but grazing incidence Bragg reflection requires crystalline structure.

Ionizing radiation in the form of energetic particles can propagate along fiber body 20 by successive Bragg reflections of de Broglie waves. The phenomenon is well known in the study of electron diffraction (R. B. Leighton, "Principles of Modern Physics," McGraw-Hill, New York, 1959, pp. 81-86). Bragg reflection of de Broglie waves is qualitatively similar to Bragg reflection of γ-rays and depends on the presence of a crystalline structure for the inner wall of fiber body 20. Energetic particles may also propagate by direct atomic scattering off atoms composing the inner wall of fiber body 20. This type of scattering, called Rutherford scattering (R. B. Leighton, "Principles of Modern Physics," McGraw-Hill, New York, 1959, pp. 71-72), does not depend on crystal structure.

Ionizing radiation may also propagate along fiber body 20 by changing its form. Charged particles passing close to an atomic nucleus can produce X-rays and γ-rays through the bremsstrahlung process (R. B. Leighton, "Principles of Modern Physics," McGraw-Hill, New York, 1959, pp. 408-415), and these photons can then propagate along fiber body 20 by the previously described mechanisms. Similarly, a sufficiently energetic photon passing close to a relatively heavy atomic nucleus can decay to a particle-antiparticle pair, such as an electron and a positron (D. H. Perkins, "Introduction to High Energy Physics," Addison-Wesley, Reading, Mass., 1972, pp. 39-41). The electron can continue to propagate through Bragg reflection of de Broglie waves, but the positron will quickly be annihilated into two or more new propagating photons of lower energy than the first.

Finally, with regard to the design of fiber body 20, it is important to discuss radiation leakage. Until now the fiber flexibility has ben stressed in the design. This might lead to the false notion that fiber body 20 should have walls as thin as possible, so long as it doesn't collapse. Actually the walls of fiber body 20 must be thick enough to prevent escape of the ionizing radiation it is carrying. This is easy to understand since, for example, in medical applications unwanted leakage of radiation exposes a patient to unnecessary risks. For a nickel body 20 with walls 0.02 cm thick carrying 2 MeV $He^+$ ions, the wall thickness is twenty times the range of the ions in nickel (L. C. Northcliffe and R. F. Shilling, "Range and Stopping Power Tables for Heavy Ions," Nuclear Data Tables, Section A, 7(#3-4) January 1970). In this case it has been conservatively estimated that the leakage loss for a 3 cm length of fiber body 20 is less than one millionth of the radiation input into fiber body 20.

Ionizing radiation can generally only travel a short distance in matter because the very act of producing ions robs the radiation of its energy, thereby limiting its range. This is especially true of energetic charged particles. For example a 10 MeV proton has a range of only about 1 meter in air (R. B. Leighton, "Principles of Modern Physics," McGraw-Hill, New York, 1959, p. 735). X-rays and γ-rays have a considerably greater range and may travel tens of meters in air. However even these photons of ionizing radiation have difficulty traveling kilometers in air. Therefore, many application involving the transmission of ionizing radiation through fiber body 20 will require evacuation of the interior of fiber body 20. Evacuation can be achieved by covering one end of fiber body 20 with thin film cap 30, whose construction was described in the previous section, and withdrawing the air from the opposite open end of fiber body 20. The thin film cap is at least semitransparent to ionizing radiation so that ionizing radiation can exit fiber body 20. Experiments have shown that the design presented for cap 30 is strong enough to withstand atmospheric pressure at the tip of fiber body 20 with dimensions given in the previous section.

Normally, when radiation exits fiber body 20, it forms a cone with an apex angle of only about 0.63°. The presence of thin film cap 30 spreads the beam a little more. For certain applications it may be highly desirable to have a narrow intense beam. For example, it has been experimentally determined that such a beam delivering 0.1 microamperes of 1.892 MeV helium ions is capable of raising the temperature of a target, with a specific heat of about 1 cal/gm C.° and a thermal conductivity close to that of human tissue, to a temperature of 274° C. Such a high temperature can be very useful in destroying certain types of tumors as discussed in the background section.

In many applications, however, spreading the beam will be required. FIG. 2 shows the most efficient way of performing this simple function. Numerous tiny obstructions 32 have been placed on the inside surface of cap 30. Radiation from the fiber body is denoted as "incident radiation" in FIG. 2. Suppose this incident radiation is long wavelength X-rays. When such radiation strikes the steep sides of these obstructions at grazing incidence angles the reflected radiation, called "outgoing radiation" in FIG. 2, is sent into new directions. Therefore, the X-ray beam is effectively spread. The obstructions can be made of nickel, gold, beryllium, or aluminum since these metals are efficient at reflecting X-rays (T. Zebnpfennig, R. Giacconi, R. Haggerty, W. Reidy, and G. Vaiana, "A Laboratory Program to develop Improved Grazing Incidence X-ray Optics," NASA, Washington, D.C., February 1967). However, the composition of obstructions 32 need not be limited to these materials. For example, chemical vapor deposition of rhenium or tungsten needles would also form suitable obstructions 32 because of their steep sides of varying inclination. For shorter wavelength X-rays and γ-rays or particles, deflection of radiation will take place by Bragg reflection and other scattering mechanisms previously discussed.

In conclusion, it should be noted that the mechanisms involved in propagation of radiation through a flexible hollow core fiber are still under investigation and I do not wish to be bound by any of the mechanisms described in this application.

SUMMARY, RAMIFICATIONS, AND SCOPE

Thus the reader will see that the fiber of my invention provides a method of (a1) transmitting ionizing radiation around curves;
(b1) allowing the frequency, or particle type and energy, of the transmitted radiation to be selected by chosing the proper type of radiation source to be used with the fiber;
(c1) allowing transmission of ionizing radiation with only minute losses due to leakage through the fiber wall;
(d1) allowing transmission of ionizing radiation at intensities capable of producing heating, if necessary, on the target which receives the ionizing radiation;
(e1) allowing transmission of ionizing radiation over great distances.

While my above description contains many specificities, these should not be construed as limitations on the scope of the invention, but as merely providing illustrations of some of the presently preferred embodiments of this invention. For example, the fiber capable of transmitting ionizing radiation may (a2) be made of materials other than stainless steel, including various kinds of glasses or a combination of materials.
(b2) have a thin film cap made of carbon, gold, or other materials which spread the exiting beam of ionizing radiation as well as provide an airtight cap for evacuation of air.
(c2) have a multilayer thin film cap incorporating a variety of materials;
(d2) have radiation scattering obstructions made of materials other than those previously cited including any elements, compounds, polymers, materials with a variable stoichiometric composition, and both crystalline and noncrystalline materials;
(e2) have radiation scattering obstructions which are collectively a mixture of different shapes and (or) compositions;
(f2) have radiation scattering obstructions each of which has a composition which is a mixture of materials, such as beads made of shells of different materials;
(g2) have radiation scattering obstructions which are collectively a mixture of different designs;
(h2) have radiation scattering obstructions on either side of, or both sides of, or (and) are embedded within, the film of the thin film cap.

Accordingly, the scope of my invention should be determined not by the embodiments illustrated or previously described, but by the appended claims and their legal equivalents.

I claim:

1. A method of transmitting an ionizing particle radiation comprising propagation of said ionizing particle radiation by a series of reflections and scatterings through the interior of a hollow core fiber, whose length may vary from several centimeters to many kilometers and whose X-ray absorbing wall is thin enough to allow flexibility but is thick enough to minimize escape of said ionizing particle radiation through the wall of said hollow core fiber, whereby said ionizing particle radiation can be used for radiation therapy of tumors and other applications.

2. The method of transmitting an ionizing particle radiation of claim 1 further including an air tight thin film cap made of an X-ray absorbing material, which is at least partially transparent to said ionizing particle radiation, at one end of said hollow core fiber, whereby air can be removed from the opposite end of said hollow core fiber to decrease attenuation of said ionizing particle radiation along the length of said hollow core fiber.

3. The method of transmitting an ionizing particle radiation of claim 1 further including use of at least one spherical gold partial obstruction, located at one end of said hollow core fiber, capable of spreading the exiting beam of said ionizing particle radiation into new directions, whereby objects of larger area may be irradiated by the broadened beam of said ionizing particle radiation.

* * * * *